United States Patent [19]
Beller et al.

[11] Patent Number: 5,222,140
[45] Date of Patent: Jun. 22, 1993

[54] CRYPTOGRAPHIC METHOD FOR KEY AGREEMENT AND USER AUTHENTICATION

[75] Inventors: Michael J. Beller, Red Bank; Li Fung Chang, Holmdel; Yacov Yacobi, Berkeley Heights, all of N.J.

[73] Assignee: Bell Communications Research, Inc., Livingston, N.J.

[21] Appl. No.: 789,700

[22] Filed: Nov. 8, 1991

[51] Int. Cl.[5] .......................... H04L 9/30; H04L 9/08
[52] U.S. Cl. ..................................... 380/30; 380/21; 380/23; 380/49; 379/95; 340/825.31; 340/825.34
[58] Field of Search .................. 380/9, 21, 30, 43, 49, 380/50, 23; 379/61, 62, 95; 340/825.31, 825.34

[56] References Cited

U.S. PATENT DOCUMENTS

| | | | |
|---|---|---|---|
| 4,912,762 | 3/1990 | Lee et al. | 380/49 X |
| 4,956,863 | 9/1990 | Goss | 380/30 |

OTHER PUBLICATIONS

"Encryption Algorithm For Computer Data Protection", Federal Register, Part I, (vol. 40, No. 52; Mar. 17, 1975).
A. Shimizu et al., "Feal-Fast Data Encipherment Algorithm," Systems and Computers in Japan, 1988, vol. 19, No. 7., pp. 20–34.
S. Miyaguchi, "The Feal Cipher Family," *Proceedings of CRYPTO '90*, 1990, Santa Barbara, CA, pp. 1–12.
H. C. Williams, "A Modification of RSA Public-Key Encryption," *IEEE* Transaction on Information Theory, Nov. 1980, vol. IT-26, No. 6, pp. 726–729.
M. O. Rabin, "Digitalized Signatures and Public Key Functions as Intractable as Factorization," MIT Laboratory for Computer Science, Jan. 1979, TR 212, pp. 1–16.
Z. Shmuely, "Composite Diffie–Hellman Public Key Generating Schemes Are Hard To Break," Computer Science Department of Technion, Feb. 1985, Israel, TR 356, pp. 1–18.
K. S. McCurley, "A Key Distribution System Equivalent to Factoring," *Journal of Cryptology*, 1988, vol. 1, No. 2, pp. 95–105.

*Primary Examiner*—Bernarr E. Gregory
*Attorney, Agent, or Firm*—Leonard Charles Suchyta

[57] ABSTRACT

Protocols for session key agreement and authentication in a communication system such as a portable communication system make use of public key cryptographic techniques. The protocols of the present invention are especially suited for use in a portable communication system because portable telephones are required by the inventive protocols to perform only a minimal amount of processing, while assigning the heavier computations to the network. The inventive protocols also authenticate the weaker (i.e. portable) side. The protocols also ensure that a third party cannot trace the location of a user by eavesdropping on a radio signal transmitted by a portable telephone.

23 Claims, 3 Drawing Sheets

CRYPTOGRAPHIC METHOD FOR KEY AGREEMENT AND USER AUTHENTICATION

FIELD OF THE INVENTION

The present invention relates to a cryptographic method for maintaining privacy and security in a communication system, such as a portable communication system, which is subject to eavesdropping and fraudulent access attempts. In particular, the present invention utilizes public key cryptographic techniques for session key agreement and authentication in a portable communication system.

BACKGROUND OF THE INVENTION

In a portable communication system, users carry low power, low cost, portable digital radio telephones from place to place during and between calls.

Some portable telephones employ a Digital Signal Processor (DSP) to implement the complicated algorithms that are needed to code speech at low bit rates. Other portable telephones utilize a custom chip for the low bit rate coding of speech and include a low power general purpose microcontroller for handling signalling protocols and other miscellaneous tasks. In either case, the portable telephone must operate for long periods of time on small batteries and a low power implementation of all signal processing operations inside the portable telephone is important. Accordingly, there is a limit on the complexity of any signal processing operation which can take place inside the portable telephone.

In a portable communication system, the portable radio telephones access the local exchange telephone network via a suitably dense matrix of shoebox sized radio ports which are located on utility poles or in buildings. Each port comprises a relatively simple radio modem. Each port is in turn connected back to the telephone network switching system by way of a port control unit which may be located in a central office building. A port control unit performs a variety of processing functions including converting between a format suitable for use on the radio link between the portable telephones and the radio ports and a format suitable for use in the telephone network switching system.

Because a portable communication system transmits conversations between portable telephones and an array of fixed location ports via radio, the conversations of a portable communication system are more susceptible to eavesdropping than are the conversations of a wireline network.

In addition, unlike wireline telephones, which are tied to a particular wire pair on a particular system, portable telephones roam from place to place and access the network via different ports at different times. The lack of association between a user and a particular physical location can make a portable communication system vulnerable to attempts at the fraudulent acquisition of services.

The present invention is particularly concerned with message encryption (i.e. encryption of conversation content), key agreement and distribution (i.e. distribution of the keys required by message encryption techniques) and authentication (i.e. ensuring that a service request is legitimate). In particular, the present invention is concerned with foiling the eavesdropper, i.e., one who utilizes radio equipment to intercept the radio transmissions between the portable telephones and the ports.

Another problem which characterizes portable communication systems is the problem of user traceability. Specifically, if a user transmits identifying information in the clear, it is possible for an eavesdropper to determine the location of the user, so that privacy with respect to a user's location is not maintained. The present invention also relates to maintaining the privacy of a user location. (An existing system, see e.g., ETSI GSM specification, does partially protect the privacy of user locations. But this system requires user/database synchronization, and, under certain circumstances will require user identifying information to be transmitted in the clear via the radio link.)

Eavesdropping can be thwarted through the use of a message encryption technique. A message encryption technique employs an encipherment function which utilizes a number referred to as a session key to encipher data (i.e. conversation content). Only the portable telephone and the specific port control unit with which the portable telephone is in communication have knowledge of the session key, so that only the proper portable telephone and the port control unit, as paired on a particular conversation, can encrypt and decrypt digital signals. Two examples of encipherment functions are the National Bureau of Standards Data Encryption Standard (DES) (see e.g., National Bureau of Standards, "Data Encryption Standard", FIPS-PUB-45, 1977) and the more recent Fast Encipherment Algorithm (FEAL) (see e.g., . Shimizu and S. Miyaguchi, "FEAL-Fast Data Encipherment Algorithm," Systems and Computers in Japan, Vol. 19, No. 7, 1988 and S. Miyaguchi, "The FEAL Cipher Family", Proceedings of CRYPTO '90, Santa Barbara, Calif., Aug., 1990). One way to use an encipherment function is the electronic codebook technique. In this technique a plain text message m is encrypted to produce the cipher text message c using the encipherment function f by the formula $c=f(m,sk)$ where sk is a session key. The message c can only be decrypted with the knowledge of the session key sk to obtain the plain text message $m=f^{-1}(c,sk)$.

One problem with the use of the encipherment functions such as DES and FEAL in a portable communication system is the problem of session key agreement.

In the conventional session key agreement technique, each portable telephone i has a secret key $k_i$ known only to it and a cryptographic database DB. Similarly, each port control unit j has a secret key $k_j$, known only to it and the cryptographic database DB. At the start of a communication session, the portable telephone i sends a service request and its identity i in the clear to a port control unit j. The port control unit sends the pair (i,j) to the cryptographic database DB. The DB picks a random session key sk and sends to the port control unit j the pair $c_i, c_j$ where $c_i=f(k_i,SK)$ and $c_j=f(k_j,sk)$. The port control unit j deciphers $c_j$ to find sk and sends $c_i$ to the portable telephone i. The portable telephone i deciphers $c_i$ to find sk. Now both the port control unit j and the portable telephone i are in possession of the session key sk. Thus, enciphered messages $c=f(m,sk)$ can be transmitted back and forth between the portable telephone i and the port control unit j.

This approach has several advantages. First the approach requires minimal power in the portable telephone because it utilizes only conventional cryptography. In particular, the computation power required to evaluate f and $f^{-1}$ is quite small.

In addition, the conventional key distribution approach is also self-authenticating because a portable telephone trying to impersonate the portable telephone i must know the ostensibly secret key $k_i$ ahead of time.

On the other hand, the conventional key distribution protocol requires a database of secret cryptographic keys, which is hard to protect and maintain, and adds survivability and reliability problems to the system. A primary weakness is that a potential eavesdropper can obtain the key $k_i$ for the portable telephone i once, and can subsequently intercept all of i's conversations without i knowing about it. This is the worst kind of damage that can occur; undetectable compromise of privacy. Also, the conventional key distribution protocol has a traceability problem. A portable telephone must announce its identity in the clear before a session key can be fetched from the database. Thus, an eavesdropper can determine the location of a particular portable.

In view of the foregoing, it is an object of the invention to provide a session key agreement protocol which overcomes the shortcomings of the conventional key agreement protocol for a portable communication system. Specifically, it is an object of the invention to utilize public key cryptographic techniques to provide a key agreement protocol for a portable communication system, which protocol eliminates the need for a cryptographic database, authenticates portable telephone identities, and protects as private portable telephone locations.

Before discussing public key cryptographic techniques, it is useful to provide some background information. Most practical modern cryptography is based on two notorious mathematical problems believed (but not proven) to be hard (i.e. not solvable in polynomial time, on the average). The two problems are known as Factorization and Discrete-Log. The Factorization problem is defined as follows:

Input: N, where $N = pq$ where p and q are large prime numbers

Output: p and/or q.

The Discrete-Log problem is defined as follows:

Input: P,g,y, where $y \equiv g^x \mod P$, and P is a large prime number

Output: x.

(The Discrete-Log problem can be similarly defined with a composite modulus $N = pq$).

Based on the Factorization and Discrete-Log problems, some other problems have been defined which correspond to the cracking problems of a cryptographic system.

One example of such a problem which has previously been exploited in cryptography (see, e.g., H. C. Williams, "A Modification of RSA Public-Key Encryption", IEEE Transactions on Information Theory, Vol. IT-26, No. Nov. 6, 1980) is the Modular Square Root problem, which is defined as follows:

Input: N,y, where $y \equiv x^2 \mod N$, and $N = pq$, where p and q are large primes Output: x Calculating square roots is easy if p and q are known but hard if P and q are not known. When N is composed of two primes, there are in general four square rots mod N. As used herein, $z \equiv \sqrt{x} \mod N$ is defined to mean that x is the smallest integer whereby $z^2 \equiv x \mod N$.

Another problem is known as the Composite Diffie-Hellman (CDH) problem, which is defined as follows:

Input: N, g, $g^x \mod N$, $g^y \mod N$, were $N \equiv pq$ and p and q are large primes.

Output: $g^{xy} \mod N$.

It has been proven mathematically, that the Modular Square Root and Composite Diffie-Hellman problems are equally difficult to solve as the above-mentioned factorization problem (see, e.g., M. O. Rabin, "Digitalized Signatures and Public Key Functions as Intractable as Factorization", MIT Laboratory for Computer Science, TR 212, Jan. 1979; Z. Shmuely, "Composite Diffie-Hellman Public Key Generating Schemes Are Hard To Break", Computer Science Department of Technion, Israel, TR 356, Feb. 1985; and K. S. McCurley, "A Key Distribution System Equivalent to Factoring", Journal of Cryptology, Vol. 1, No. 2, 1988, pp. 95–105).

How secure is a system based on factorization?. To crack the system, an attacker must factor the composite modulus N-P.q or do another operation of comparable complexity. It has been estimated that factoring a 512-bit number could be done in one year, given an investment on the order of $100 million, given the 1990 state of the art. This is an investment not likely to be made by an eavesdropper trying to intercept routine conversations in a portable communication system.

In a typical public-key cryptographic system, each user i has a public key (e.g. a modulus N) and a secret key (e.g., the factors P and q). A message to user i is encrypted using a public operation which makes use of the public key known to everybody (e.g., squaring a number mod N). However, this message is decrypted using a secret operation (e.g. square root mod N) which makes use of the secret key (e.g., the factors P and q).

This type of public key system has been utilized for message encryption and decryption in a variety of communication systems. However, due primarily to the high computational complexity of previously existing public key cryptographic protocols and given the generally low computational power of portable terminals in a portable communications system, public key cryptographic techniques have not previously been utilized to solve the key agreement and authentication problems in a portable communication system.

SUMMARY OF THE INVENTION

In accordance with an illustrative embodiment of the present invention, public key cryptographic techniques are utilized for both session key agreement and authentication in a portable communication system.

Consider a portable telephone with the identification number i and port control unit with the identification number j. The port control unit j has one or more public keys and one or more secret keys. For example, a public key of the port control unit may be a modulus $N_j$ and a secret key of the port control unit may be the large prime numbers $P_j$ and $q_j$, such that $N_j = p_j q_j$. Similarly, the portable telephone i may have one or more public keys and one or more secret keys.

In accordance with the present invention, a session key is distributed to the portable telephone i and the port control unit j as follows. At the start of a communication session, a public key of the port control unit is transmitted via a radio link to the portable telephone. At the portable telephone, an electronic processor is utilized to select a number x. Using the public key of the port control unit, a public operation y is performed on x at the portable telephone to generate a quantity $e_1 = y(x)$. This public operation is hard to invert without knowledge of a secret key, Which is known only to the port control unit. The quantity $e_1$ is then transmitted to the port control unit, which utilizes its secret key to obtain $x = y^{-1}(e_1)$. Thus, x is now known to both the portable telephone and the port control unit.

In one illustrative embodiment of the invention, the public key of the port control unit comprises the modulus $N_j$ and the secret key of the port control unit comprises the factors $p_j$ and $q_j$. The public operation $Y(x)$ can be any one-way trap door function such as $e_1 = y(x) = x^2 \mod N_j$ and the secret operation is $x = \sqrt{e_1} \mod N_j$. In this case, the number x, which is now distributed to both the portable telephone and the port control unit, may be used as the session key.

In an alternative embodiment a Diffie-Hellman technique is utilized. The portable telephone possesses a public key $P_i$ and a secret key $S_i$ such that $P_i = g^{S_i} \mod N$, where N is either prime or a product of two primes. The port control unit has a public key $P_j$ and a secret key $S_j$ such that $P_j = g^{S_j} \mod N$, as well as the public key $N_j$ and the secret key $p_j, q_j$. The value of x is distributed to the portable telephone and port control unit in the manner described above. In addition, $P_j$ is communicated to the portable telephone and $P_i$ is communicated to the port control unit using an encipherment function with x as the key so that $P_i$ which can serve to identify the portable telephone i is not transmitted in the clear. At the portable telephone $\eta = P_j^{S_i}$ is determined. A session key is then determined by the formula $sk = f(x, \eta)$ where f is an encipherment function. At the port control unit $\eta = P_i^{S_j}$ is determined and the encipherment function is utilized to obtain $sk = f(x, \eta)$. Thus, both the portable telephone and the port control unit have determined the session key sk.

In comparison to the conventional key distribution technique described previously, in both of the illustrative embodiments of the invention, no database is utilized and the portable telephone does not identify itself in the clear. The second embodiment of the invention provides a higher level of security because the port control unit is not supplied with enough information so that someone with access to the port control unit could learn to impersonate the user.

In combination with key distribution, the present invention also utilizes public key cryptographic techniques for portable telephone and port control unit authentication. In this case, the portable communication system is assumed to have a trusted central authority u, which may be a network administrator. The central authority has a public certification key such as modulus $N_u$ and a secret certification key such as the factors $p_u$ and $q_u$ (where $N_u = p_u q_u$). The central authority has a secret operation which can only be performed with knowledge of the secret certification key such as square root mod $N_u$. The inverse operation is public and can easily be performed with knowledge of the public certification key.

Illustratively, each portable telephone i is provided with a certificate $c_i$ by the trusted central authority at the time it first signs up for service by the portable communication system. The certificate $c_i$ is formed by performing a secret operation of the central authority on a function of a linkage including the identity of the portable telephone i. For example, $c_i = \sqrt{g(i)} \mod N$ where g is a one-way function which takes its argument and expands it to the modulus size.

A portable telephone requesting service can send a message $m = (i, c_i)$, where $(i, c_i)$ is a linkage formed by concatenating i and $c_i$, to a port control unit. The message m may be encrypted using x as an encryption key to form the encrypted message $e_2 = f(x, m)$ so that so that information identifying the portable telephone i is not transmitted in the clear. The port control unit receives the encrypted message $e_2$ and decrypts this message. The port control unit performs a public operation of the central authority on the certificate $c_i$ using the public key of the central authority (e.g. $c_i^2 \mod N_u$) and determines if the result is equal to g(i) to authenticate the portable telephone.

In a similar manner, the port control unit j is provided with a certificate $c_j$ which is formed by performing a secret operation of the central authority on a function of a linkage which is formed by concatenating the identity j and a public key of the port control unit (e.g., $c_j = \sqrt{h(j, N_j)} \mod N_u$ where h is a hashing function). A portable telephone requesting service via the port control unit j, can authenticate the port control unit j by receiving from the port control unit j a message $m = (j, N_j, c_j)$. The portable telephone performs the public operation of the central authority on the certificate $c_j$, e.g., $c_j^2 \mod N_u$, and authenticates the port control unit by determining if in fact $c_j^2 \mod N_u$ is equal to $h(j, N_j)$.

The protocols of the present invention provide several significant advantages. First, as the protocols obviate the need for a portable telephone to transport identifying information in the clear, the protocols protect information about a user's location from a potential eavesdropper. In contrast to prior art systems, the protocols of the present invention do not suffer from the requirement of database/user synchronization and never require user identification information to be transmitted in the clear.

In addition, it is highly advantageous that the protocols of the present invention perform key agreement in an asymmetric manner (i.e. the processing requirements at the weak portable side are much less than the processing requirements at the strong port control unit side) and also authenticate the weak side. Both asymmetry and authentication of the weak side are highly desirable in a portable communication system which demands low power operation for the portable, while maintaining network security against perpetrators of fraud.

While the present invention is described in connection with an embodiment in which portable telephones communicate via radio links with port control units, the present invention is equally applicable to any system wherein user terminals communicate via a communication channel with a network access device, and where there is a need for privacy and authentication. For example, a user terminal such as a small laptop computer with digital radio circuitry may be used in a network for data transmission instead of, or in addition to, voice transmission. In addition, other transmission media besides a radio link, such as a coaxial cable, may be utilized to connect user terminals (e.g. portable telephones, laptop computers) to a network access device (e.g. a port control unit). The protocols of the present invention may be utilized to prevent eavesdropping and fraudulent access in these types of systems.

BRIEF DESCRIPTION OF THE DRAWING

FIG. 2, FIG. 3, and FIG. 4 schematically illustrate session key distribution and authentication protocols in

DETAILED DESCRIPTION OF THE INVENTION

Figure 1:
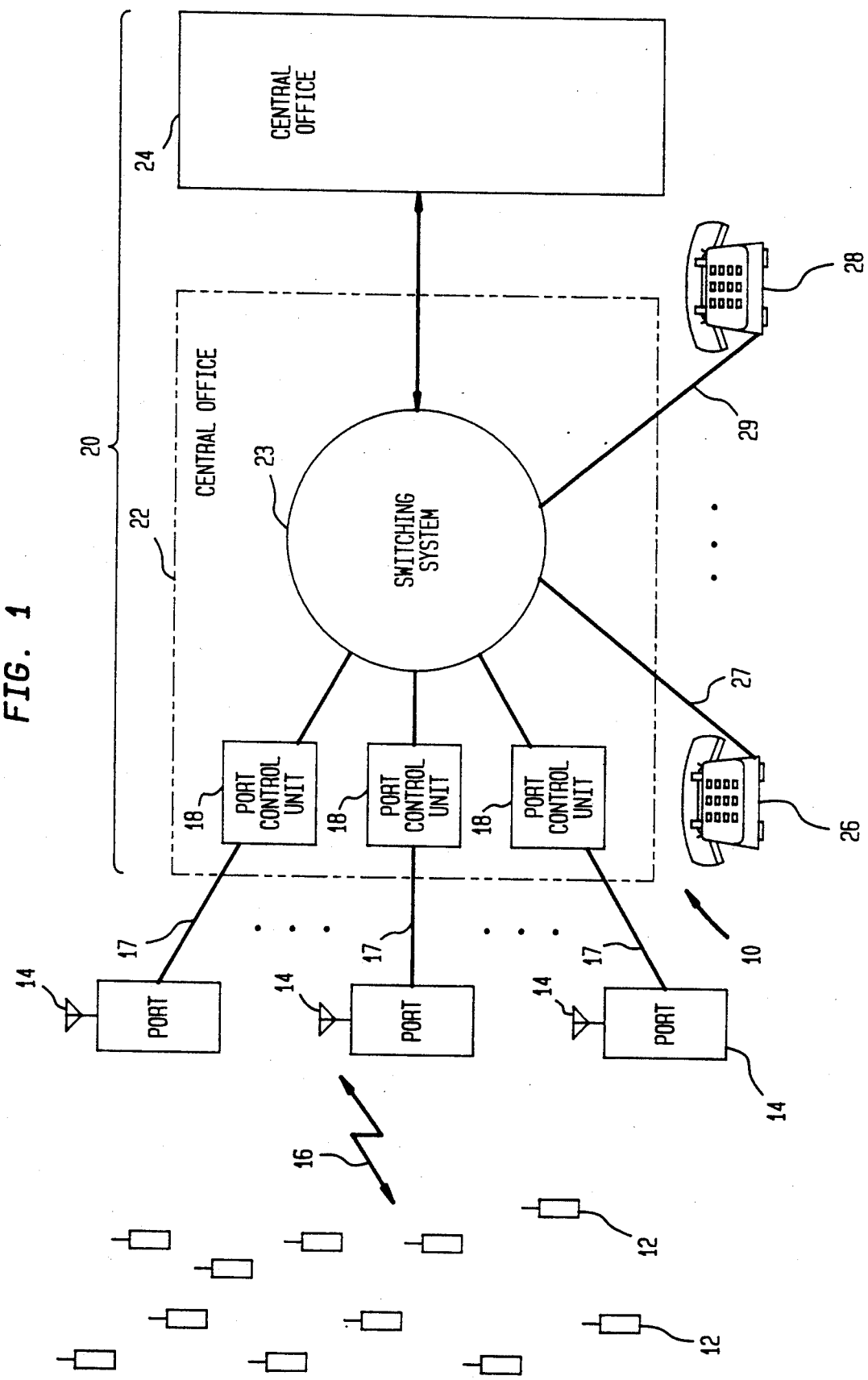
FIG. 1 schematically illustrates a portable communication system.

A portable communication system 10 is schematically illustrated in FIG. 1. The system 10 comprises a plurality of low power, low cost portable digital radio telephones 12. The portable telephones 12 are carried from place to place by their users.

The portable telephones 12 communicate with the local exchange telephone system 20. The local exchange telephone system 20 is represented in FIG. 1 by the central office 22, the central office 24, and the customer premises equipment 26 and 28 connected by wire lines 27 and 29, respectively, to the central office 22.

As indicated above, some portable telephones employ a Digital Signal Processor (DSP) to implement the complicated algorithms that are needed to code speech at low bit rates. Other portable telephones utilize a custom chip for the low bit rate coding of speech and include a low power general purpose microcontroller for handling signalling protocols and other miscellaneous tasks. In either case, a portable telephone must operate for long periods of time on small batteries and low power implementation of all signal processing operations inside the portable telephone is important.

The portable telephones 12 access the local exchange telephone system via the ports 14. A specific portable telephone 12 and a specific port 14 communicate via a radio link, schematically illustrated in FIG. 1 by the arrow 16. The ports 14 are typically of shoebox size and are located on utility poles or buildings. Each of the ports 14 comprises a simple radio modem.

The ports 14 connect back to the local exchange telephone system 20 via the lines 17 and the port control units 18. The port control units 18 are generally located in a central office building and perform a variety of signal processing functions. Specifically, a port control unit 18 translates between a format suitable for transmission via the radio link 16 and a format suitable for use in the switching system 23 of the central office 22. Each port control unit 18 also does speech transcoding and performs signal processing necessary for encryption and decryption of messages over the radio link 16.

As indicated above, an eavesdropper listening into the radio link 16 can be thwarted by encrypting the digital signals transmitted via the data link. To encrypt the digitals an encipherment function f such as DES or FEAL is utilized. As also indicated above, one technique for using an encipherment function f is to form an encrypted message c by the formula $c = ff(m, sk)$ where m is the plain text message and sk is the session key. In this case, the plain text message m is retrieved according to the formula $m = f^{-1}(c, sk)$. Thus, both encryption and decryption require knowledge of the session key sk.

Figure 2:
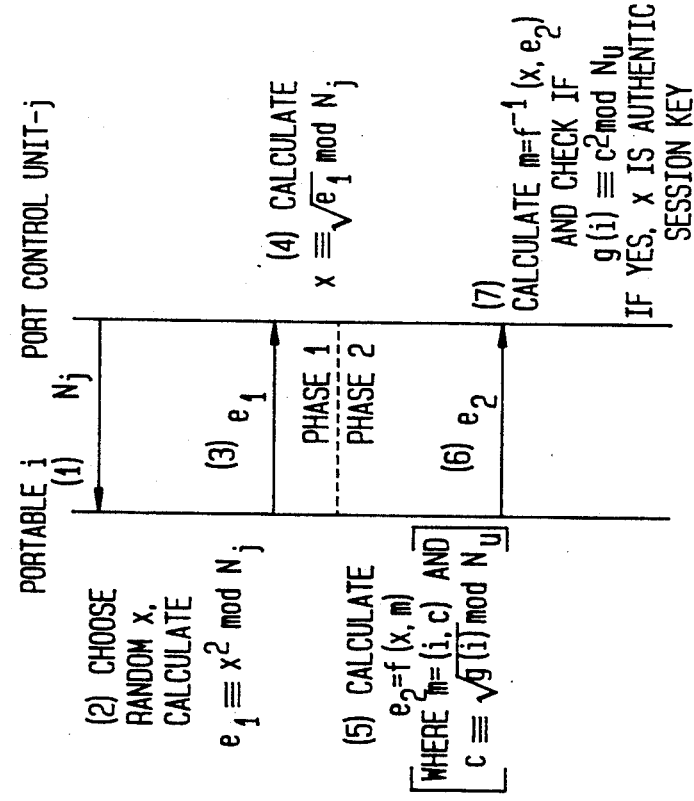

A method for distributing a session key to a portable telephone with an identity i and a port control unit with an identity j in accordance with an embodiment of the present invention is illustrated in FIG. 2. The port control unit j has a public key. Illustratively, the public key is in the form of a modulus $N_j$. The port control unit j also has a secret key. Illustratively, the modulus $N_j$ is the product of two primes $p_j$ and $q_j$, whose identity form a secret key of the port control unit j. To simplify computations in the port control unit, it is desirable for $p_j \equiv 3 \pmod{4}$, $q_j \equiv 3 \pmod{4}$.

Phase I of the protocol shown in FIG. 2 provides a session key to the port control unit j and portable telephone i. Upon receiving an access request from the portable telephone i, the port control unit j sends its secret key in the form of the modulus $N_j$ to the telephone i (step 1, FIG. 2). Utilizing a Digital Signal Processor or microcontroller, the portable telephone picks a random number x to serve as a session key. The portable telephone then computes $e_1 = y(x)$, where $y(x)$ is a function that is easily evaluated utilizing the public key $N_j$ of the port control unit, but is hard to invert without knowledge of the secret key of the port control unit (step 2, FIG. 2). For example, $y(x) = e_1 \equiv x^2 \bmod N_j$. The portable i then sends $e_1$ to the port control unit j (step 3, FIG. 2). The port controller unit then computes $x = y^{-1}(e_1)$ which equals, for example, $\sqrt{e_1} \bmod N_j$ to obtain the session key x (step 4, FIG. 2). Both sides now have the session key x and can begin communicating using an encipherment function. No one other than the port control unit j can obtain the square root of $e_1$ because only the port control unit j knows the factors $P_j$ and $q_j$ of the modulus $N_j$. Unlike the conventional key distribution technique, described above, no database was utilized to obtain the session key and the portable telephone did not identify itself in the clear.

Phase II of the protocol of FIG. 2 authenticates the portable telephone i. A trusted central authority, such as the administrator of the portable communication system 10 of FIG. 1, has a public key such as a modulus $N_u = p_u \cdot q_u$. Only the central authority knows $p_u$ and $q_u$, but $N_u$ is public information. At service initiation, the portable telephone i is given a secret certificate $c_1$ which is formed by utilizing the secret key of the central authority to perform a secret operation on the identification i of the portable telephone. Illustratively, $c_i = \sqrt{g(1)} \bmod N_u$. Here, g is a one-way function which takes its argument and expands it to the modulus size.

In phase II of the protocol of FIG. 2, the portable telephone generates a message m comprised of i and $c_i$. The message m is enciphered using an encipherment function f to form the quantity $e_2 = f(x, m)$ (step 5, FIG 2). The quantity $e_2$ is then transmitted to the port control unit j (step 6, FIG. 2).

The port control unit j obtains the clear text message $m = f^{-1}(x, e_2)$. Thus, the port control unit now has knowledge of i and $c_i$. The port control unit utilizes its knowledge of the value i to evaluate $g(i)$. The port controller utilizes its knowledge of $c_i$ to evaluate $c_i^2 \bmod N_u$. If the port controller determines $g(i) = c_i^2 \bmod N_u$, it is receiving a legitimate service request from the portable telephone i (step 7, FIG. 2). It should be noted that while someone obtaining the certificate $c_i$ will be able to defraud the service provider to obtain free calls until such service is discontinued to that individual, obtaining the secret certificate $c_i$ does not compromise the privacy of legitimate conversations of the user i. An attacker obtaining the secret certificate of i only obtains free calls and this attacker will eventually be detected, e.g., by the legitimate user of the portable telephone i, who gets billed for calls he/she did not make. This is totally different from the conventional key distribution technique, wherein once the secret key of a user i is compromised, the privacy of user i's conversational content is permanently and undetectably compromised.

The protocol of FIG. 2 is very well suited for use in the portable communication system of FIG. I because of the asymmetry in the processing performed by the portable telephone and the port control unit. From the perspective of the portable telephone, the key distribution protocol of FIG. 2 requires only a single modular squaring. If the portable telephone includes a Digital Signal Processor (DSP), this calculation can easily be done by the DSP during the call setup period. If the portable telephone contains no DSP, then any microcontroller contained in the portable telephone can perform this operation. Specifically, due to the requirement of only a single squaring, a portable unit which contains only a small microcontroller (and no DSP) can still perform the required calculations in real time, i.e., with an acceptable calculation delay on the order of a few hundred milliseconds using current low-power microcontroller technology. In either case, no special purpose hardware is required to execute the protocol. On the other hand, the port controller unit is required to take a modular square root. This is feasible when the factors of the modulus are known, as is the case in the protocol of FIG. 2. However, taking modular square roots in real time requires much more computation power than performing a squaring operation. For example, when the modulus N has 512 bits, two exponentiations with a 256 bit modulus and 256 bit base are required. However, the port control unit can be provided with the processing power to carry out these operations.

One weakness of the protocol discussed in connection with FIG. 2, is that while the portable telephone authenticates itself to the port control unit, the port control unit does not authenticate itself to the portable telephone unit. This would allow an attacker to simulate a port control unit and thereby gain user authentication certificates for use in defrauding the network.

Figure 3:
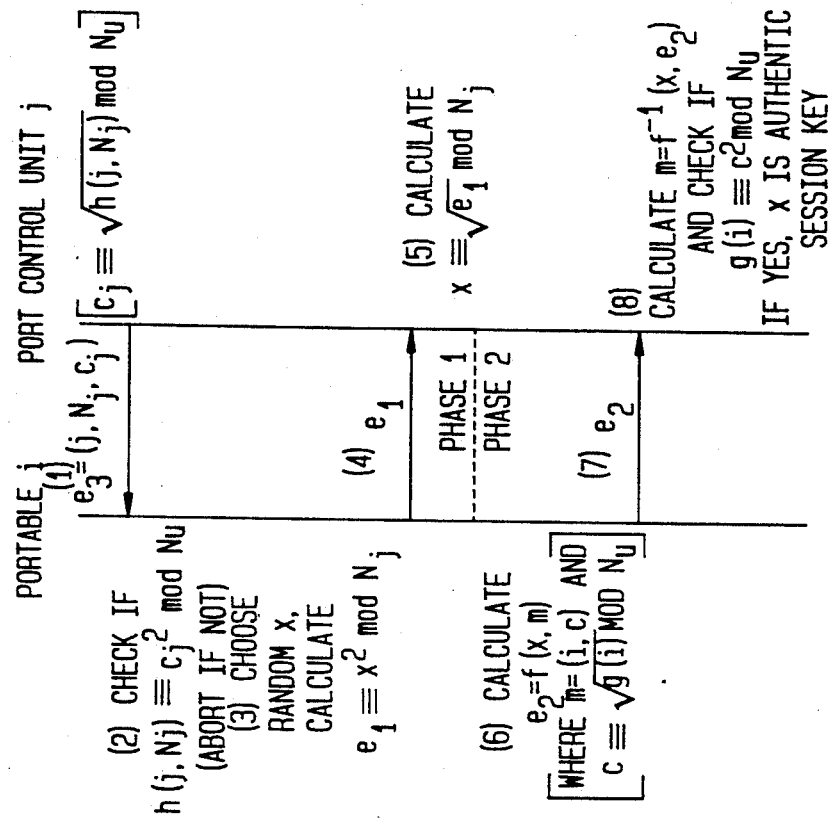

To overcome this problem, phase I of the protocol of FIG. 2 is modified to form a protocol illustrated in FIG. 3. In particular, in phase I of the protocol of FIG. 3, the port control unit j has an authentication certificate $c_j \equiv \sqrt{h(j,N_j)}$ mod $N_u$ which is obtained from the central authority. Here h is a one way function like g, only h hashes its argument to reduce it to the modular size, whereas g expands its argument. As used herein the term hashing function refers to a function which takes a long input and produces a short output. The operation of a hashing function is hard to reverse because many different inputs result in the same output.

Upon receipt of a service request at the port control unit j, the port control unit j transmits to the portable telephone a linkage $e_3$ comprising the port control unit identity j, the public key N: and the certificate $c_j$ (step 1, FIG. 3). The portable telephone h(j, $N_j$) based on the received values of j and $N_j$, squaring the certificate $c_j$, and comparing to h(j,$N_j$) (step 2, FIG. 3). Session key exchange and portable telephone authentication proceed in the same manner as in the protocol of FIG. 2 (steps 3–8 of FIG. 3 being identical to steps 2–7 of FIG. 2).

A weakness of the protocols of FIG. 2 and FIG. 3 is that the port control unit is provided with permanent secret information of the portable telephone, i.e., the certificate $c_i$, which aids in impersonation attacks.

Figure 4:
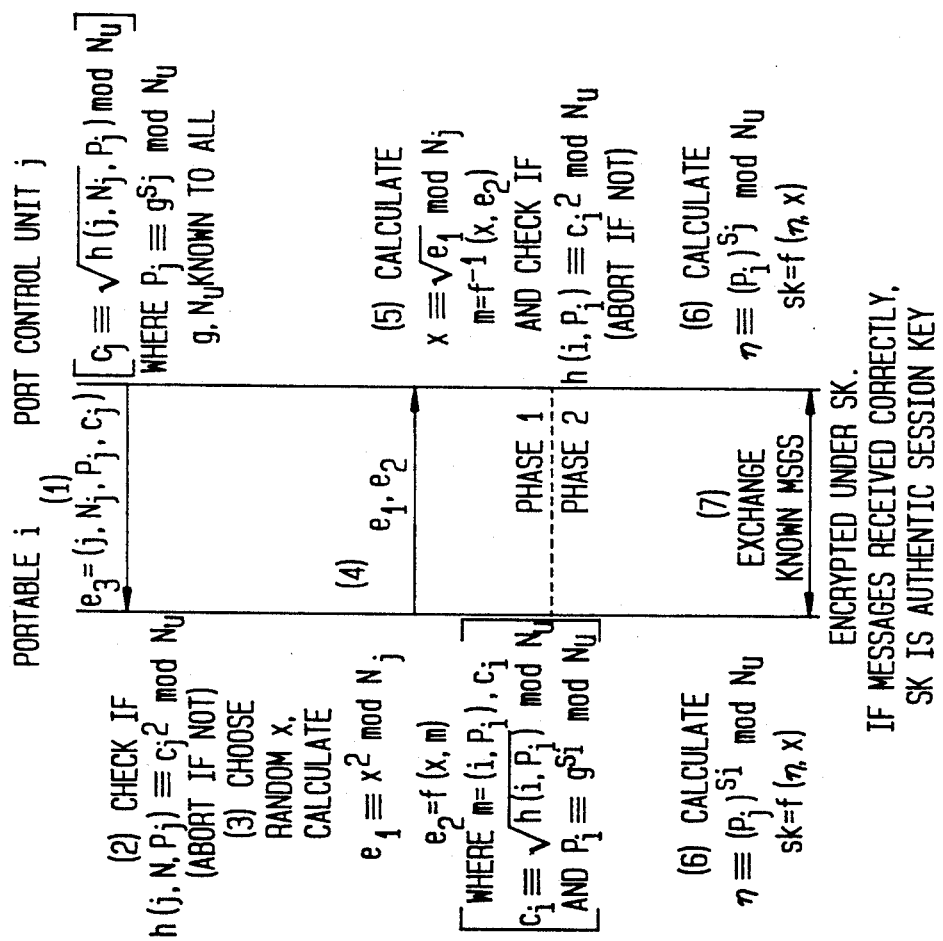

This weakness is overcome in the protocol of FIG. 4, which makes use of the composite Diffie-Hellman technique described above. In the protocol of FIG. 4, the port control unit is not provided with sufficient permanent secret information of a portable telephone to cause vulnerability to impersonation attacks.

In the protocol of FIG. 4, the portable telephone i has a public key $P_i$ and a secret key $S_i$ such that $P_i \equiv g^{S_i}$ (mod N), where N is either prime or the product of two primes. Similarly, the port control unit j has a public key $P_j$ and a secret key $S_j$ such that $P_j = g^{S_j}$ mod N.

In phase I of the protocol of FIG. 4, the port control unit j transmits to the portable telephone i a linkage $e_3$ comprising j, $P_j$, $N_j$ and a certificate $c_j$ (step 1 of FIG. 4). The certificate $c_j$ is a signature on a hash of the linkage (j,$P_j$,$N_j$), i.e., $c_j = \sqrt{h(j,P_j,N_j)}$ mod $N_u$. The portable telephone can then verify the authenticity of the port control unit b checking whether h(j,$P_j$,$N_j$) mod $N_u \equiv c_j^2$ mod $N_u$ (step 2 of FIG. 4). The portable telephone has also obtained $N_j$ and $P_j$ for use later in the protocol.

The portable telephone then picks a random number x and computes a hard to invert function $e_1$ of x such as $e_1 \equiv x^2$ mod $N_j$. The portable telephone also generates an encrypted message $e_2 = f(x,m)$, where m comprises the linkage (i,$P_i$) and the certificate $c_i \equiv \sqrt{h(i,P_i)}$ mod $N_u$ (step 3 of FIG. 4). The quantities $e_1$ and $e_2$ are then transmitted from the portable telephone i to the port control unit j (step 4 of FIG. 4).

The port control unit calculates $x \equiv \sqrt{e_1}$ mod $N_j$. The port control unit then decrypts the message $e_2$ to obtain m and then squares the certificate $c_i$ and compares this value to h(i,$P_i$) to authenticate the portable telephone (step 5 of FIG. 4). It should be noted, however, that the particular certificate sent by the portable telephone to the port control unit does not give someone with access to the port control unit enough information to impersonate the portable telephone. The reason is that the port control unit does not receive the secret key $S_i$ that corresponds to the public key $P_i$.

In phase II of the protocol of FIG. 4, the portable telephone unit i computes $\eta = DH(P_j,S_i) \equiv P_j^{S_i}$ mod N. The port control unit computes $\eta = DH(P_i,S_j) \equiv P_i^{S_j}$ mod N. The portable telephone and port control unit now obtain a common key sk = f($\eta$,x) (step 6 of FIG. 4). The portable telephone i and the port control unit j then exchange known messages encrypted using sk. If the messages are received correctly, sk is an authentic session key (step 7 of FIG. 4).

The complexity of the protocol of FIG. 4 is dominated by the Diffie-Hellman exponentiation of phase II. This is achievable in real time in portable telephones with a DSP or with special exponentiation hardware, but not in a portable telephone which relies only on a small microcontroller for computation.

In short, there has been disclosed herein inventive protocols for key distribution and authentication in a portable communication system. The inventive protocols make use of public key cryptographic techniques. Finally, the above-described embodiments of the invention are intended to be illustrative only. Numerous alternative embodiments may be devised by those skilled in the art without departing from the spirit and scope of the following claims.

We claim:

1. A method for enabling a user terminal i and a network access unit j in a communication system to choose a session key for a communication session comprising the steps of:

at the start of a communication session, transmitting a public key from the network access unit to the user terminal via a communication channel, at the user terminal, utilizing an electronic device to select a number x and to perform a public operation on the number x utilizing the public key received from the network access unit, transmitting via said communication channel the result of said public operation from said user terminal to said network access unit, and at said network access unit, performing a secret operation on said result utilizing a secret key of the network access unit to invert said public operation to compute the number x.

2. The method of claim 1 wherein the number x is said session key.

3. The method of claim 1 wherein said public key of said network access unit includes a modulus N: and said secret key of said network access unit includes the prime numbers $p_j$ and $q_j$, where $N_j = p_j q_j$.

4. The method of claim 3 wherein said public operation is $e_1 = x^2$ mod $N_j$ where $e_1$ is said result, and said secret operation is $x = \sqrt{e_1}$ mod $N_j$.

5. The method of claim 1 wherein said user terminal has a secret key $S_i$ and a public key $P_i$ and wherein said network access unit has a further secret key $S_j$ and a further public key $P_j$ such that $P_j{}^{S_i} \equiv P_i{}^{S_j}$ mod N, where N is a modulus and wherein said method further comprises the steps of transmitting $P_j$ to said user terminal, transmitting $P_i$ to said network access unit, evaluating at said user terminal $\eta \equiv P_j{}^{S_i}$ mod N and determining a session key $sk = f(x,\eta)$ where f is an encipherment function, evaluating at said network access unit $\eta \equiv P_i{}^{S_j}$ mod N and determining said session key $sk = f(x,\eta)$ whereby both said network access unit and said user terminal are in possession of said session key sk.

6. The method of claim 1 Wherein said method further comprises the step of authenticating said user terminal at said network access unit.

7. The method of claim 6 wherein said step of authenticating said user terminal comprises transmitting from said user terminal to said network access unit a linkage including public identification information of the user terminal and an authentication certificate, which if legitimate, is the result of utilizing a secret certification key to perform a secret certification operation on a function of said linkage, and at said network access unit, utilizing a public certification key to perform a public certification operation to invert said secret certification operation and determining if the result of said inversion is identical to said function of said linkage.

8. The method of claim 1 wherein said method further comprises the step of authenticating said network access unit to said user terminal.

9. The method of claim 8 wherein said authenticating step comprises transmitting from said network access unit to said user terminal a linkage including public identification information of the network access unit, and an authentication certificate which is the result of utilizing a secret certification key to perform a secret certification operation on a function of said linkage, and at said terminal, utilizing a public certification key to perform a public certification operation to invert said secret certification operation and determining if the result of the inversion is identical to said function of said linkage.

10. The method of claim 1 wherein said user terminal is a portable telephone of a portable communication system, said communication channel is a radio link, and said network access unit is a port control unit of said portable communication system.

11. The method of claim 1 wherein said public operation is a one-way trapdoor function.

12. A method for enabling a user terminal and a network access unit in a communication system to choose a session key for a communication session comprising the steps of at the start of a communication session, transmitting via a communication channel from a network access unit to a user terminal a modulus $N_j$, $N_j = p_j Q_j$, where $p_j$ and $q_j$ are large prime numbers known only to the network access unit j, utilizing an electronic device at the user terminal to select a number x and to evaluate a quantity $e_1 = y(x)$ mod $N_j$, where $y(x)$ is a function which is hard to invert without knowledge of the factors $p_j$ and $q_j$, transmitting via said communication channel the quantity $e_1$ from said user terminal to said network access unit, at said network access unit, determining $x = y^{-1}(e_1)$ mod $N_j$, whereby the number x is now known to said user terminal and said network access unit, and utilizing said number x as a session key to send encrypted messages between said user terminal and said network access unit.

13. The method of claim 12 wherein said method further comprises the steps of utilizing an electronic processor comprising part of said user terminal to generate a plain text message m which includes i and $c_i$ where i is an identification number of said user terminal and $c_i$ is a certificate of said user terminal, encrypting said plain text message m at said user terminal utilizing an encipherment function f to obtain an encrypted message $e_2 = f(x,m)$, transmitting said encrypted message $e_2$ via said communication channel from said user terminal to said network access unit, and authenticating that the user terminal is a legitimate user of said communication system by decrypting said message $e_2$ and determining if $c_i{}^2$ mod $N_u$ equals g(i), where $N_u$ is a certification modulus and g(i) is a one way function which expands its argument to the size of the modulus N.

14. The method of claim 12 wherein said method includes authenticating said network access unit to said user terminal by the steps of at the start of said communication session, transmitting from said network access unit to said user terminal, in addition to said modulus $N_j$, a certificate $c_j$ of said network access unit and the identification number j of the network access unit, and authenticating said network access unit at said user terminal by utilizing an electronic processor comprising part of said user terminal to determine if $h(j,N_j)$ equals $c_j{}^2$ mod $N_u$, where h is a hashing function.

15. The method of claim 12 wherein $y(x)$ mod $N_j$ equals $x^2$ mod $N_j$ and $y^{-1}(e_1)$ mod $N_j$ equal $\sqrt{e_1}$ mod $N_j$.

16. The method of claim 15 wherein said number x is utilized by said user terminal and said network access unit to determine a session key for said communication system.

17. The method of claim 12 wherein said communication system is a portable communication system, said user terminal is a portable telephone, said communication channel is a radio link, and said network access unit is a port control unit.

18. A method for enabling a user terminal and a network access unit in a communication system to choose a session key for a communication session comprising the steps of:

at the start of a communication session, transmitting via a communication channel from the network access unit to the user terminal a public key of said network access unit, at said user terminal, utilizing an electronic processor to select a number x and to generate a quantity $e_1 = y(x)$ where $y(x)$ is a function that is evaluated utilizing said public key and that is hard to invert without knowledge of a secret key known only to said network access unit, transmitting via said communication channel said quantity $e_1$ from said user terminal to said network access unit, and at said network access unit, determining $x = y^{-1}(e_1)$ utilizing said secret key, whereby said number x is now known to said user terminal and said network access unit.

19. The method of claim 18 wherein said number x is utilized as a session key by said user terminal and said network access unit.

20. The method of claim 18 wherein said method includes the step of authenticating the identity of said user terminal to said network access unit.

21. The method of claim 18 wherein said method includes the step of authenticating the identity of said network access unit to said user terminal.

22. The method of claim 18 wherein $y(x)$ equals $x^2$ mod N, N = p.q, where N is said public key, and p and q are large prime numbers which form said secret key.

23. The method of claim 18 wherein said communication system is a portable communication system, said communication channel is a radio link, said network access unit is a port control unit and a user terminal is a portable telephone.

* * * * *